Feb. 8, 1972   F. E. GOULD ET AL   3,641,237
ZERO ORDER RELEASE CONSTANT ELUTION RATE DRUG DOSAGE
Filed Sept. 30, 1970
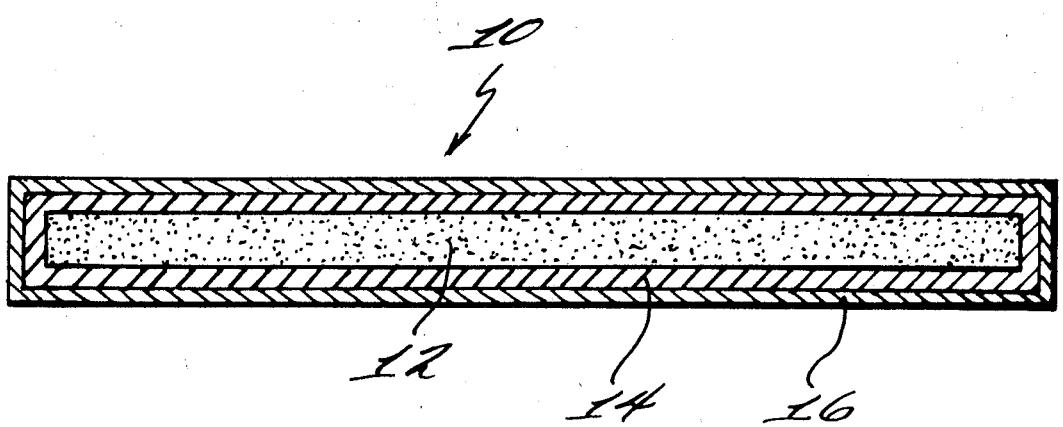
INVENTORS
FRANCIS E. GOULD
THOMAS H. SHEPHERD
BY Cushman, Darby & Cushman
ATTORNEYS 3,641,237
ZERO ORDER RELEASE CONSTANT ELUTION
RATE DRUG DOSAGE
Francis E. Gould, Princeton, and Thomas H. Shepherd, Hopewell, N.J., assignors to National Patent Development Corporation, New York, N.Y.
Continuation-in-part of application Ser. No. 766,840, Oct. 11, 1968, which is a continuation-in-part of application Ser. No. 654,044, July 5, 1967, which is a continuation-in-part of application Ser. No. 650,259, June 30, 1967, which in turn is a continuation-in-part of application Ser. No. 567,856, July 26, 1966, now Patent No. 3,520,949. This application is also a continuation-in-part of application Ser. No. 833,182, July 13, 1969. This application Sept. 30, 1970, Ser. No. 76,738
Int. Cl. A61k 27/12
U.S. Cl. 424—16
8 Claims

ABSTRACT OF THE DISCLOSURE

Zero order release of water soluble pharmaceutically active organic compounds alone or absorbed or incapsulated in hydrophilic polymers is obtained by providing a film diffusion barrier of an alkoxyethyl acrylate or methacrylate polymer. To reduce irritation: an outer coating of a non-irritating water swellable film can be also incorporated.

---

This application is a continuation-in-part of application 766,840, filed Oct. 11, 1968, which is a continuation-in-part of application 654,044, filed July 5, 1967, which is a continuation-in-part of application 650,259, filed June 30, 1967, now abandoned, which is a continuation-in-part of application 567,856, filed July 26, 1966, and now Pat. 3,520,949. It is also a continuation-in-part of application 833,182, filed July 13, 1969. The entire disclosure of patent application 766,840 and 833,182, is hereby incorporated by reference.

The incorporation of pharmaceutically active compounds in high molecular weight water-sensitive polymers to prolong release therefrom is known in the art. However, most frequently, the release profile follows first order kinetics and a high initial release rate decays rapidly as the concentration of drug in the polymer decreases. Also, with pharmaceutically active compounds which exhibit good water solubility, the release rate from highly water swollen or water soluble polymer is frequently too fast for obtaining useful prolonged release times.

It is an object of the present invention to provide a controlled zero order release of pharmaceutically active compounds.

Another object is to reduce the irritation occurring in some instances when supplying a diffusion barrier film around a drug alone or absorbed in a hydrophilic polymer.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been discovered that thin films, e.g. 0.2–10 mils thick, usually at least 0.5 mil, of polymers prepared from lower alkoxy lower alkyl acrylates and methacrylates, the preferred examples being ethoxyethyl methacrylate, methoxyethylmethacrylate, ethoxyethyl acrylate and methoxyethyl acrylate homopolymerized, copolymerized with each other, e.g. 50% ethoxyethyl methacrylate, 50% methoxyethyl methacrylate, or copolymerized with 0–40% of a hydrophilic acrylic monomer such as hydroxy lower alkyl acrylates and methacrylates, e.g. hydroxyethyl methacrylate (HEMA), hydroxyl acrylate, hydroxypropyl methacrylate, hydroxyethoxy ethyl acrylate, or other hydrophilic acrylic monomers such as hydroxyethoxyethyl acrylate, hydroxyethoxy ethyl methacrylate, hydroxypropoxypropyl methacrylate acrylamide, methacrylamide, N-lower alkyl acrylamides and methacrylamides, e.g. N-methyl acrylamide, N-methyl methacrylamide, N-ethyl acrylamide, N-ethyl methacrylamide, N-isopropyl methacrylamide, N-propyl methacrylamide, and N-butyl acrylamide provide good diffusion barriers for water soluble or water leachable drugs. Furthermore, the film thickness and the ratio of the more hydrophilic polymer, e.g. hydroxy lower alkyl acrylate or methacrylate to lower alkoxy lower alkyl acrylate or methacrylate provide excellent means of controlling the diffusion rate of the drug and that a zero order release of the drug can be attained.

The diffusion barrier films of this invention can be employed in a laminate construction to provide a device for controlled zero-order release of water soluble drugs for topical application to such body surfaces as the epidermis, the eye, vaginal mucosal tissues, etc. A typical laminate construction is shown in the single figure of the drawing wherein 10 designated the overall drug package which comprises an inner water soluble drug containing layer 12, a diffusion barrier 14 and an outer non-irritating layer 16. Layer 12 contains the drug in sufficient concentration for the total dosage requirement during the treatment period and can even be in excess of such amount. This layer can consist of the drug alone, or the drug in combination with various adjuvants. For the purpose of this invention it is preferred to incorporate the drug absorbed or encapsulated in a highly water swellable polymer matrix which can be prepared in film form for ease of handling and lamination to the diffusion rate controlling film. Suitable polymer matrixes include those materials disclosed in parent U.S. Appl. Ser. No. 766,840 and Ser. No. 833,182.

The size of inner layer 12 is not critical and it is not essential that it be in film form.

As set forth in application 766,840, such polymer matrixes can be made from a hydrophilic monomer which is a hydroxy lower alkyl acrylate or methacrylate, or hydroxy lower alkoxy lower alkyl acrylate or methacrylate, e.g. 2-hydroxyethyl acrylate, 2-hydroxyethyl methacrylate, diethylene glycol monoacrylate, diethylene glycol monomethacrylate, 2-hydroxypropyl acrylate, 2-hydroxypropyl methacrylate 3-hydroxypropyl acrylate, 3-hydroxypropyl methacrylate and dipropylene glycol monomethacrylate. The preferred monomer for preparing the matrixes are the hydroalkyl acrylates and methacrylates, most preferably, 2-hydroxyethyl methacrylates. The polymers produced are organic solvene soluble, e.g. alcohol soluble, but water insoluble.

While homopolymers can be employed in making the matrix frequently it is desirable to use a cross-linked copolymer. Preferably, the cross-linking agent is present in an amount of 0.1 to 2.5%, most preferably, not over 2.0%, although, from 0.05 to 15%, or even 20%, of cross-linking agents can be used. Of course, care should be taken that cross-linking agents are not used in an amount which renders the product toxic. Cross-linking renders the otherwise organic solvent soluble polymers insoluble, although it does not impair the hydrophilic properties.

Typical examples of cross-linking agents include ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate, divinyl benzene, divinyl toluene, diallyl tartrate, allyl pyruvate, allyl maleate, divinyl tartrate, triallyl melamine, N,N'-methylene bis acrylamide, glycerine trimethacrylate, diallyl maleate, divinyl ether, diallyl monoethylene glycol citrate, ethylene glycol vinyl allyl citrate, allyl vinyl maleate, diallyl itaconate, ethylene glycol diester of itaconic acid, divinyl sulfone, hexahydro-1,3,5-triacryltriazine, triallyl phosphite, diallyl ester of benzene phosphonic acid, polyester of maleic anhydride with triethylene glycol, polyallyl glucose, e.g. triallyl glucose, polyallyl sucrose, e.g. pentaallyl sucrose, sucrose diacrylate, glucose dimethacrylate, pentaerythritol tetraacrylate, sorbitol dimethacrylate, diallyl aconitate, divinyl citraconate, diallyl fumarate.

Polymerization to make the matrix of such water insoluble hydrophilic polymer can be carried out by various procedures. Thus the polymer can be formed as a casting syrup and then cured. Alternatively, the hydrophilic polymers are prepared by suspension polymerization of the hydrophilic monomer, including the cross-linking agent and stopping the polymerization when the polymer formed will precipitate in water, but is still soluble in highly polar organic solvents such as alcohols, glycols and glycol ethers. Examples of suitable solvents are ethyl alcohol, methyl alcohol, isopropyl alcohol, ethylene glycol, propylene glycol, diethylene glycol, dipropylene glycol, monomethyl ether of ethylene glycol, dimethyl formamide, dimethyl sulfoxide and tetrahydrofuran.

The suspension polymerization is carried out in a nonpolar medium such as silicone oil, mineral oil, xylene, etc.

The polymer formed in the suspension polymerization or obtained from the casting syrup, either directly or after precipitation with water, is then dissolved in the appropriate solvent as indicated above and can be admixed with the pharmaceutical, the solvent removed and, if necessary, the polymerization completed.

When the casting syrup is employed, polymerization can be carried out until a solid is formed with pharmaceutical entrapped therein.

The casting syrup is cured to form products which exists in a solid state, e.g. rigid state, and can be swollen. The polymer obtained from the cured liquid has reversible fluid absorption properties, the ability to retain its shape in a fluid absorption media and to elastically recover its shape after deformation.

As catalysts for carrying out the polymerization, there is employed a free radical catalyst in the range of 0.05 to 1% of the polymerizable hydroxyalkyl ester or the like. The preferred amount of catalyst is 0.1 to 0.2% of the monomer. Usually, only a portion of the catalyst, e.g. 10-20% is added initially to the monomer and the balance is added to the solution or casting syrup after partial polymerization. Typical catalysts include t-butyl-peroctoate, benzoyl peroxide, isopropyl percarbonate, methyl ethyl ketone peroxide, cumene hydroperoxide, and dicumyl peroxide. Irradiation, e.g. by ultra violet light or gamma rays, also can be employed to catalyze the polymerization. Polymerization can be done at 20 to 150° C., usually 40 to 90° C.

The resulting polymers can be prepared in the form of films or rods suitable for grinding into fine powders. By admixing foaming agents such as sodium bicarbonate with the reactants prior to curing, the polymer may be obtained in the form of a foam which is easily disintegrated into a fine powder by means of a shearing action. Quantities of 1 to 10 grams foaming agent, e.g. 2 grams of sodium bicarbonate, per 100 grams of reactants have been found to be sufficient.

Polymeric powders prepared by any of the above means are mixed with the desired therapeutic substances, dissolved in an appropraite solvent if necessary, and the mixture placed on a mechanical roller so that the solution becomes intimately mixed. The solution is then filtered and dried by air evaporation or forced heat. Upon evaporation of the solvent, the therapeutic substance is retained by the powder.

Such matrixes are preferably in anhydrous form to insure that there is no premature decomposition of the entrapped pharmaceutical or drug. The polymer matrix protects the entrapped drug from atmospheric oxygen (as does the novel diffusion barrier film of the present invention).

There can also be used as the matrix for entrapping the drug the water soluble polymers of application 833,182. Thus there can be used water soluble hydrophilic polymers of hydroxy lower alkyl acrylates and methacrylates. For example, there can be employed copolymers of hydroxyethyl acrylate, hydroxypropyl acrylate, hydroxyethyl methacrylate or hydroxypropyl methacrylate with 0.5 to 20% of a water solubilizing copolymerizable monomer. The copolymerizable monomer should be present in amount sufficient to be sure that the polymer is completely soluble in water. Of course, mixtures of hydroxyalkyl acrylates and methacrylates can be employed. Thus, while the hydroxyalkyl methacrylate esters are preferred as starting material up to about 40% by weight of hydroxyalkyl acrylate can be used in the hydroalkyl methacrylate containing mixture of monomers.

The solubilizing comonomer in polymerizing the hydroalkyl acrylate or methacrylate can be either (1) an ammonium or alkali metal (e.g. sodium or potassium) salt of a polymerizable ethylenically unsaturated (or nonbenzeneoid unsaturated) organic acid or (2) a strong acid salt of a polymerizable ethylenically unsaturated (or nonbenzeneoid unsaturated) amino containing monomer.

Examples of organic acids for making the ammonium and alkali metal salts include acrylic acid, methacrylic acid, maleic acid, fumaric acid, itaconic acid, aconitic acid, cinnamic acid, crotonic acid, cyclohexene carboxylic acid, propiolic acid, mesaconic acid, citraconic acid, vinyl sulfonic acid, p-vinylbenzenesulfonic acid, partial esters such as mono 2-hydroxyethyl citraconate, mono 2-hydroxypropyl itaconate, mono 2-hydroxyethyl itaconate, mono 2 - hydroxypropyl citraconate, mono 2 - hydroxyethyl maleate, mono 2-hydroxypropyl fumarate, mono methyl itaconate, monoethyl itaconate, mono methyl cellosolve itaconate (methyl cellosolve is the monomethyl ether of ethyllene glycol), mono methyl cellosolve maleate, mono 2-hydroxyethyl aconitate.

Examples of strong acid salts of polymerizable amino containing monomers are the hydrochloric, hydrobromic, sulfuric acid, nitric acid, phosphoric acid, benzene sulfonic acid, naphthalene sulfonic acid, trichloroacetic acid, and p-toluene acid salts of diethylaminoethyl methacrylate, dimethyl aminoethyl methacrylate, monomethylaminoethyl methacrylate, t-butylaminoethyl methacrylate, p-aminostyrene, o-aminostyrene, 2 - amino-4-vinyltoluene, diethylaminoethyl acrylate, dimethylaminoethyl acrylate, t-butylaminoethyl acrylate, piperidinoethyl acrylate, piperidinoethyl methacrylate, morpholinoethyl acrylate, morpholinoethyl methacrylate, 2-vinyl pyridine, 3-vinyl pyridine, 4-vinyl pyridine, 2-ethyl-5-vinyl pyridine, dimethylaminopropyl acrylate, dimethylamino propyl methacrylate, dipropylaminoethyl acrylate, dimethylaminoethyl vinyl ether, dimethylaminoethyl vinyl sulfide, diethylaminoethyl vinyl ether, aminoethyl vinyl ether, 2 - pyrrolidinoethyl methacrylate, 3 - (dimethylaminoethyl)-hydroxypropyl acrylate, 3-(dimethylaminoethyl)-2-hydroxypropyl methacrylate, 2-aminoethyl acrylate, 2-aminoethyl methacrylate. The alkylaminoethyl acrylates and methacrylates are preferred in group (2).

A portion (up to 40% of total monomers) of the hydroxyalkyl acrylate or methacrylate can be replaced by acrylamide, methacrylamide, n-isopropyl methacrylamide, n-methylacrylamide, n-methyl methacrylamide, N-2-hydroxyethyl acrylamide, N-(2 - hydroxyethyl methacrylamide).

Usually 0.1 to 35% of the entrapped material is employed based on the weight of the matrix polymer.

The water soluble polymers employed in the present invention are infinitely soluble in water, although at concentrations above 30% solution viscosity rises sharply.

Solubility of the polymers is pH dependent. For example, polymers containing salts of carboxylic or sulfonic acids as part of the structure will not be soluble at a pH below about 3.5 and polymers containing amine salts as part of the structure will not be soluble at a pH above about 8.5.

There can be employed any water soluble drug, e.g. pilocarpine, aspirin, ascorbic acid, penicillin, procaine penicillin G, procaine hydrochloride, penicillin N, Penicillin O, penicillin V, tetracycline, tetracycline hydrochloride, oxytetracycline, chlortetracycline, streptomycin, neomycin B, neomycin C, sulfanilamide, sulfadiazine sodium, sulfamerazine sodium, nicotinamide, Vitamin $B_{12}$, biotin, p-aminobenzoic acid, inositol, insulin hydrochloride, epinephrine, epinephrine hydrochloride, chloramphenicol, phenobarbital sodium, butabarbital sodium, amobarbital sodium, secobarbital sodium, bromisovalium, codeine, codeine sulfate, codeine hydrochloride, nitroglycerine, amphetamine sulfate, d-amphetamine sulfate, diethyl stilbestrol 4,4' - diphosphonic ester disodium salt, cortisone, cortisone phosphate, cortisone phosphate monosodium salt, cortisone phosphate disodium salt, thiopropazate hydrochloride, prednisolone phosphate sodium, atrophine sulfate, atropine, pentylenetetrazole, N-acetyl p-aminophenol, hyoscyamine, hyoscyamine hydrobromide, hyoscyamine sulfate, chlorpheneramine maleate, phenyl ephrine hydrochloride, quinidine sulfate, quinidine hydrochloride, theophylline, ephedrine hydrochloride, ephedrine sulfate, pyrilamine maleate, pyrilamine hydrochloride.

The products can be used in human or veterinary therapy, e.g. to treat dogs, cats, horses, cattle, sheep, goats, pigs, rabbits, guinea pigs, etc.

Layer 14 constitutes the diffusion barrier film which may be applied by solvent coating a previously prepared drug-bearing film, e.g. using methanol or ethanol as a solvent, or by heat laminating a prepared diffusion barrier film to or around the drug bearing layer. The laminate is heat sealed around the edges.

Layer 16 consists of a highly water swellable film which is non-irritating to sensitive mucosa such as the surface of the eye, and though which, diffusion of the drug is rapid compared to the rate of diffusion through the barrier film. In the event that the barrier film itself is non-irritating, this layer may be omitted, suitable materials for layer 16 are polymers of hydroxy-lower alkyl acrylates and methacrylates, and copolymers of these monomers with minor amounts (0–50%) of alkoxy alkyl acrylates and methacrylates. The thickness of the outer layer is not critical, although for convenience it is usually 0.2 to 5 mils.

Thus the layer 16 can be made of a homopolymer of hydroxyethyl methacrylate, hydroxyethyl acrylate, hydroxypropyl methacrylate, hydroxypropyl acrylate, a copolymer of hydroxyethyl methacrylate with methoxyethyl methacrylate (80:20), a copolymer of hydroxyethyl methacrylate with ethoxyethyl acrylate (75:25), a copolymer of hydroxyethyl acrylate with methoxyethyl methacrylate and ethoxyethyl methacrylate (80:10:10). The layer 16 can also be made of polyvinyl alcohol, polyvinyl pyrrolidone, hydroxyethyl methacrylate, vinyl pyrrolidone copolymer, e.g. (5:95 or 95:5), carboxymethyl cellulose, methyl cellulose, ethyl cellulose, hydroxyethyl cellulose.

Unless otherwise indicated all parts and percentages are by weight.

Following examples A–L illustrate the preparation of polymers useful for entrapping drugs to serve as drug containing layer 12. In some instances there is also disclosed the incorporation of a drug therein.

The polymers prepared in Examples A, H, J, K, L, are useful in preparing the outer layer 16 if the drug is omitted.

EXAMPLE A

Suitably purified 2-hydroxy ethyl methacrylate (100 g.) is stirred with 0.15 g. isopropyl percarbonate in an anaerobic atmosphere at ambient temperature. Ethylene glycol dimethacrylate in the concentration of 0.1 g./100 g. 2-hydroxy ethyl methacrylate is added.

Phenoxymethyl penicillin, an antibiotic, is dissolved in ethyl alcohol, and added to the mixed methacrylate solution in an amount to provide for gradual release of 1,200,000 units per gram of casting syrup. The cast product formed either in shaped, e.g. film form or powdered form are employed as a pharmaceutical carried for the antibiotic, thus forming layer 12. The use of casting syrup shaped or powdered preparation has the advantage that it prevents deterioration and loss of potency to which the antibiotic is subject in conventional pharmaceutical carriers, thereby extending the shelf life or expiration date of the antibiotic preparation.

The polymerization of the casting syrup to a solid can be completed, e.g. by adding 0.3 g. of further isopropyl percarbonate and heating to 40° C. The product can, omitting the phenoxymethyl penicillin, serve as the outer coating 16.

EXAMPLE B

In 3 cc. of 2-hydroxyethyl methacrylate containing .2% of ethylene glycol dimethacrylate and 0.15% tertiary butyl peroctoate was dissolved 100 milligrams of ascorbic acid. The solution was cast in the form of a cylinder 1 cm. by 3 cm. and was polymerized at 80° C. for 3 hours in a nitrogen atmosphere. After removing from the mold, a cylinder suitable for use in the invention to provide prolonged release of the ascorbic acid was obtained.

EXAMPLE C

Distilled 2-hydroxyethyl methacrylate (100 g.) is stirred with 0.1 g. tertiary butyl peroctoate in an anaerobic atmosphere at 25–70° C. for 15–40 minutes. The resultant mixture is cooled to 25° C. and tertiary butyl peroctoate added so as to make the total concentration of tertiary butyl peroctoate in the system 0.2/100 grams of 2-hydroxyethyl methacrylate. Ethylene glycol dimethacrylate, in a concentration of 0.2 g./100 g. of 2-hydroxyethyl methacrylate is added at the same time as the catalyst concentration is brought up to the theoretical content.

100 g. of the resulting syrup was added to three times its volume of water with vigorous agitation. The white precipitation so obtained was isolated by filtration and dried to yield 9.0 g. of polymer showing an intrinsic viscosity of 1.03 when dissolved in absolute methanol.

EXAMPLE D

A solution was made of 100 parts of 2-hydroxyethyl acrylate, 0.2 part of ethylene glycol dimethacrylate and 0.4 part of t-butyl peroctoate. 0.1 part of aspirin added and then cast into a mold and polymerized to form a film.

EXAMPLE E

A solution was made of 100 parts of an isomeric mixture of hydroxypropyl methacrylates, 0.2 part propylene glycol dimethacrylate and 0.4 part of t-butyl peroctoate and then case into a mold and polymerized to form a film.

EXAMPLE F 100 parts of 2-hydroxyethyl methacrylate was stirred with 0.05 part of t-butyl peroctoate in a nitrogen atmosphere at a temperature of 40° C. for 30 minutes. The resultant mixture was cooled to 25° C. and t-butyl peroctoate added so as to make the total amount of t-butyl peroctoate added in the system 0.15 part. 0.1 part of ethylene glycol dimethacrylate was also added along with the second addition of the t-butyl peroctoate and cast to form a film.

EXAMPLE G

The process of Example F was repeated, substituting 0.2 part of 1,3-butylene glycol dimethacrylate in place of the ethylene glycol dimethacrylate as the cross-linking monomer.

EXAMPLE H

Into a 30-gallon reactor was charged 40 lbs. of hydroxyethyl methacrylate, 4 lbs. of methacrylic acid, 120 lbs. of methanol and 0.05 lb. of t-butyl-peroctoate. The reactor was heated to 80° C. and allowed to stir 6 hours to effect polymerization. To the polymer solution thus obtained was added 2.5 lbs. of sodium methoxide dissolved in 25 lbs. of methanol. The resulting solution was added slowly to a 10-fold excess of acetone to precipitate the polymer. After drying, a yield of 36 lbs. of water soluble polymer was obtained.

EXAMPLE I

The polymer of Example H was dissolved in methanol to provide a 10 weight percent solution. To the solution was added tetracycline hydrochloride at a level of 20% of the polymer content of the solution. The solution was then cast as a 20 mil film (wet) on a polyethylene sheet and dried.

EXAMPLE J

Example H was repeated with the exception that 1180 g. of potassium hydroxide dissolved in 2-gallon of water was employed for neutralization.

EXAMPLE K

Into a 30-gallon reactor was charged 40 lbs. of hydroxyethyl methacrylate, 1 lb. of methacrylic acid, 120 lbs. of methanol and 0.05 lb. of t-butyl peroctoate. The reactor was heated to 85° C. and allowed to stir 5 hours to effect polymerization. The polymer was isolated by precipitation from the alcohol solution with water, and allowed to dry. A yield of 37 lbs. was obtained. The polymer was re-dissolved in methanol to provide a 10 weight percent solution. To the solution was added 1 liter of 10% ammonium hydroxide, and the solution was spray-dried to provide a water soluble powder suitable for entrapment of drugs of the type set forth above, e.g. using 10% of additive with the copolymer.

EXAMPLE L

Into a 30-gallon reactor was charged 40 lbs. of hydroxyethyl methacrylate, 3 lbs. of dimethylaminoethyl methacrylate, 120 lbs. of methanol and 0.05 lb. of diisopropyl percarbonate. The reactor was heated to 75° C. and was stirred 7 hours to effect polymerization. The polymer was isolated by precipitation with water, and dried. A yield of 35 lbs. was obtained. 10 grams of the polymer was dissolved in 90 g. of 0.1 N HCl and the pH was adjusted to 4.5 with dilute sodium hydroxide. To the solution was added 3.5 g. of insulin hydrochloride and the solution was dried at 25° C. in vacuo to provide a film having the drug trapped therein.

EXAMPLE M

The polymer of Example H was dissolved in a 50:50 methanol/water mixture to provide a solution containing 15% solids. In 100 g. of the solution was dissolved 5 g. of sodium acetyl salicylate (aspirin). The solution was dried as a thin film on a rotating evaporator.

EXAMPLE N

Example N was repeated using amobarbitol sodium in place of aspirin. Equivalent results were obtained.

EXAMPLE O

The polymer of Example H was dissolved in ethanol to provide a solution containing 15% solids. In 100 grams of the solution were dissolved 3 grams of penicillin and the solution dried as a thin film as in Example M.

Examples 1, 4, 5 and 6 below illustrate the preparation of polymers suitable for barrier film 14 while Examples 2, 3 and 7 illustrate the preparation of polymers useful either to entrap the drug, i.e. to form layer 12 or as the non-irritating layer 16.

EXAMPLE 1

A 2-liter reaction vessel equipped with an electric mantle, an electric stirrer and a $CO_2$ inlet tube was charged with 30 g. 2-hydroxyethyl methacrylate, 270 g. ethoxyethyl methacrylate, 1.2 g. t-butyl-peroctoate and 1200 g. methanol.

The solution was heated and stirred under carbon dioxide atmosphere at 67° C. for 15 hours. The polymer was then precipitated by pouring the vessel contents into 5 liters of rapidly agitated water. The polymer was isolated by filtration, thoroughly washed with distilled water, and allowed to dry under reduced pressure. The polymer was then further purified by redissolving in methanol in a blender, filtering through a fritted glass filter (medium porosity) and reprecipitating in rapidly agitated water in a blender. The resulting polymer was then dried at reduced pressure until constant weight was reached. The yield of dry polymer was 95%.

EXAMPLE 2

The procedure of Example 1 was repeated, but the vessel was charged with the following mixture:

| | G. |
|---|---|
| 2-hydroxyethyl methacrylate | 120 |
| Methoxyethyl methacrylate | 15 |
| 2-ethoxyethyl methacrylate | 15 |
| t-Butyl peroctoate | 0.3 |
| Methanol | 600 |

85% of polymer dried under reduced pressure until constant weight was reached. Films of this polymer were non-irritating to rabbit eyes.

EXAMPLE 3

Following the same procedure as Example 1, the vessel was charged with the following mixture:

| | G. |
|---|---|
| 2-hydroxyethyl methacrylate | 75 |
| 2-ethoxyethyl methacrylate | 75 |
| t-Butyl peroctoate | 0.3 |
| Methanol | 600 |

The dry polymer yield was 85%. Films of this polymer were non-irritating to rabbit eyes.

EXAMPLE 4

Following the same procedure as Example 1, the vessel was charged with:

| | G. |
|---|---|
| 2-ethoxyethyl methacrylate | 120 |
| 2-hydroxyethyl methacrylate | 30 |
| t-Butyl peroctoate | 0.6 |
| Methanol | 600 |

The dry polymer yield was 95%.

EXAMPLE 5

Example 1 was repeated with the following reactor charge:

| | G. |
|---|---|
| 2-ethoxyethyl methacrylate | 142.5 |
| 2-hydroxyethyl methacrylate | 7.5 |
| t-Butyl peroctoate | 0.6 |
| Methanol | 600 |

The yield of dry polymer was 92%.

EXAMPLE 6

Using the same procedure as Example 1, the following composition was charged to the reactor:

| | G. |
|---|---|
| 2-ethoxyethyl methacrylate | 240 |
| 2-hydroxyethyl methacrylate | 30 |
| Methoxyethyl methacrylate | 30 |
| t-Butyl peroctoate | 1.2 |
| Methanol | 1200 |

The yield of dry polymer was 91%.

EXAMPLE 7

Preparation of poly(2-hydroxyethyl methacrylate)-Hydron-S

A glass-lined reactor was charged with 200 lbs. 2-hydroxyethyl methacrylate, 526 lbs. methanol and 400 lbs. water. The mixture was slowly stirred and heated to 50° C. and 1 lb. t-butyl peroctoate was added. The temperature increase to 75° during the first 2 hours of polymerization. After additional heating at 90° C. during 30 minutes, the reactor was cooled and the polymer was precipitated by pouring the solution in rapidly agitated water (1 gallon of polymer solution in 20 gallons of water). The resulting polymer was repeatedly washed with water, filtered and dried to constant weight and ground. Further purification of the polymer was then performed by dissolving the polymer in methanol, followed by re-precipitation in water. The resulting polymer was repeatedly washed with distilled water, filtered, and dried until constant weight.

EXAMPLE 8

Preparation of a solution of plasticized Hydron-S 18 g. poly(2-hydroxyethyl methacrylate) prepared as in Example 7, and 2 g. of polyethylene glycol 600, were dissolved in 80 g. ethyl alcohol by slow stirring with magnetic stirrer. Flexible films were cast with the resulting solution. Other plasticizers can be used, e.g. glycerol, propylene glycol, dipropylene glycol, diethylene glycol, triethylene glycol and polyethylene glycols up to molecular weight 800. The plasticizer can be used in an amount of up to 40 parts per 100 of Hydron-S.

EXAMPLE 9

Solutions of the different copolymers obtained in Examples 1, 4, 5 and 6 were prepared by mixing 56 g. of dry copolymer with 130 g. ethyl alcohol (95%) and 24 g. distilled water in a blender. Trapped air bubbles were freed by overnight storage of the solution.

Multilayer films of each copolymer were coated on a horizontal casting table lined with polyethylene film which had been thoroughly washed with benzene and ethanol.

A 12 mil thick layer of copolymer solution was spread on the casting table with an applicator. The wet film was immediately covered to insure a slow rate of evaporation of the solvent, at room temperature.

The films were allowed to dry during 4 hours before they were top-coated with a 5 mil thick layer of plasticized Hydron-S, as prepared in Example 8, and allowed to dry during 1 hour. The films were then removed from the casting tables and stored at room temperature for further use (20° C. 60% relative humidity). The resulting bilayer barrier films were homogeneous, transparent, 3 to 4 mils thick. The mechanical properties are dependant upon the composition of the copolymer layer.

As previously set forth while the drug is preferably incorporated entrapped in a hydrophilic polymer as layer 12, the drug can be used alone. Thus procaine penicillin G in the form of a powder can be covered by a multifilm layer of the type shown in Example 9, using the copolymer of Example 1. The film was wrapped around the drug in the form of a pouch and heat sealed to enclose the drug.

EXAMPLE 10

250 mg. Pilocarpine Base was added to a solution of 750 mg. poly(2-hydroxyethyl methacrylate) as prepared in Example 7, in 3000 mg. ethyl alcohol (95%). The mixture was stirred with a magnetic stirrer during 1 hour and a layer of the homogeneous alcoholic solution was spread with an applicator having a 10 mils clearance, as described in Example 9. The film was allowed to dry at room temperature during 1 hour, then under reduced pressure for 2 additional hours. The resulting dry film was 2 mils thick, transparent, and could be cut to any desirable shape. This film, when placed in water, displayed a fast release of Pilocarpine Base. 1 cm.$^2$ of the core film prepared above, released 1.4 mg. Pilocarpine Base within 2 hours when placed in water at 37° C,

EXAMPLE 11

Preparation of an hydrophilic eye cavity insert

A square piece of Hydron-S core film (1 cm. x 1 cm.) containing Pilocarpine Base as prepared in Example 10, was laminated between 2 square pieces of barrier film (1.2 cm. x 1.2 cm.) as prepared in Example 9, the plasticized Hydron-S coating forming the external layer. The resulting laminate structure was slightly pressed to expell trapped air bubbles and the edges were heat sealed with a wheel type Teflon coated heat sealer. The resulting insert had a total thickness of 8–10 mils, and was transparent. Four such laminates were made (a) using the copolymer of Example 1, (b) using the copolymer of Example 4,( c) using the copolymer of Example 5, and (d) using the copolymer of Example 6.

For interocular use the maximum thickness of the 2 or 3 layer laminate is 20 mils. For other uses, however, there is no critical maximum limit in the thickness, e.g. thicknesses of 100 mils, 250 mils, or even more can be used for the laminate.

EXAMPLE 12

Determination of the elution rate of Pilocarpine Base

Inserts prepared as described in Example 11 were introduced into vials each containing 6 ml. of a solution of sodium chloride (0.9%) in distilled water, and the vials were kept at a constant temperature of 37° C. in a thermostated water bath. The concentration of eluted Pilocarpine Base in water was determined with a Beckman DB–A Spectrophotometer using the maximum absorption of Pilocarpine at 215 m$\mu$. Elution rates were checked over periods of 24 hours and were found to be dependant on the composition of the copolymer forming the barrier film. Moreover, for the same copolymer used, the elution rate was dependant on the thickness of the barrier film.

For typical barrier films made of copolymer, prepared in Examples 1, 4, 5, 6, the rate of release of Pilocarpine Base was found constant over more than 24 hours, ranging from 5 to 50 microgram of Pilocarpine Base per hour, according to the composition and the thickness of the barrier film used in the preparation of the insert.

| Barrier film made of copolymer as prepared in— | Barrier film thickness (mils) | Elution rate of pilocarpine (ug./h.) |
|---|---|---|
| Example 1 | 3.0 | 12.5 |
| Example 4 | 6.2 | 10.5 |
| Example 4 | 4.0 | 25 |
| Example 4 | 3.2 | 41 |
| Example 5 | 3.5 | 13 |
| Example 6 | 3.0 | 22 |

Placement of the 1 cm.$^2$ film pieces in rabbit eyes for 72 hours gave no sign of irritation.

It has been found that the elution rate can be kept constant for periods as short as an hour, or as long as a week or longer, so long as sufficient drug is provided.

Prior to use the laminates or film-coated drugs of the present invention have greater stability and longer shelf life than similar drugs devoid of the barrier film. This is particularly true in the case of drugs which are not entrapped in a hydrophilic polymer. As a result, deterioration and loss of potency are reduced.

The products of the present invention are useful not only for topical application, but can be used as implants, e.g. in humans, cattle, sheep, guinea pigs, dogs, etc., to provide sustained zero order release of appropriate drugs such as those set forth above, e.g. cortisone phosphate disodium, phenobarbital sodium, nicotinamide, insulin hydrochloride.

What is claimed is:

1. A sustained release homogeneous bilayer barrier film interocular hydrophilic eye cavity insert, implant, topical or ophthalmic drug dosage having reversible fluid absorption properties, the ability to retain its shape in a fluid absorption medium and a controlled, zero order constant elution rate drug release comprising a water soluble organic pharmaceutical useful for topical application or to body surfaces such as the eyes, in at least sufficient amount for the total dosage requirement during the treatment period, or in excess of said amount, wherein said drug is protected from atmosphere oxygen by being entrapped in an inner matrix of a water insoluble and water swellable hydrophilic polymer of a hydroxy lower alkyl acrylate or methacrylate or hydroxy lower alkoxy lower alkyl acrylate or methacrylate sealed in an all encompassing outer thin film drug diffusion rate controlling barrier therefor, said film barrier being a polymer of an alkoxyethyl acrylate or methacrylate with 1 to 2 carbon atoms in the alkoxy group alone, or copolymerized with up to 40% of a hydrophilic acrylic monomer, and an outer coating of a non-irritating water swellable thin film of a hydrophilic polymer selected from the group consisting of polymers of hydroxyethyl acrylate or methacrylate, polymers of hydroxypropylacrylate or methacrylate, polyvinyl alcohol, polyvinylpyrrolidone, carboxymethyl cellulose, methyl cellulose, ethyl cellulose and hydroxyethyl cellulose, non-irritating to eye sensitive mucosa, and being much more readily water permeable than said barrier film, and through which diffusion of the drug is rapid compared to the rate of diffusion through the barrier film.

2. A sustained release dosage according to claim 1 wherein hydrophilic acrylic monomer is hydroxy lower alkyl acrylate or methacrylate or hydroxy lower alkoxy lower alkyl acrylate or methacrylate.

3. A sustained release dosage according to claim 2 wherein the monomer is a hydroxy lower alkyl acrylate or methacrylate, and said film has a thickness of 0.2 to 10 mils.

4. A sustained release dosage according to claim 3 wherein the drug is entrapped in a hydrophilic water insoluble polymer which is a hydroxyethyl or hydroxypropyl acrylate or methacrylate.

5. A sustained release dosage according to claim 3 wherein the drug is entrapped in a hydrophilic water soluble polymer which is a copolymer of hydroxyethyl or hydroxypropyl acrylate or methacrylate with up to 20% of a water solubilizing copolymerizable monomer which is either (1) an alkali metal or ammonium salt of a polymerizable organic acid or (2) a strong acid salt of a polymerizable organic amine, said water solubilizing monomer units being present in the copolymer in sufficient amounts to render the copolymer completely soluble in water.

6. A sustained release dosage according to claim 2 wherein the acrylic monomer is a hydroxyl lower alkyl acrylate or methacrylate.

7. A sustained release dosage according to claim 1 in the form of said three layer film laminate, said laminate having a total thickness of between 0.6 and 20 mils, no layer being less than 0.2 mil thick.

8. A laminate as in claim 7 in the form of an eye cavity insert.

References Cited

UNITED STATES PATENTS

| | | | |
|---|---|---|---|
| 2,976,576 | 3/1961 | Wicherle et al. | 18—58 |
| 3,220,960 | 11/1965 | Wicherle et al. | 260—2.5 |
| 3,269,903 | 8/1966 | Von Fieandt et al. | 424—81 |
| 3,428,043 | 2/1969 | Shepherd | 128—268 |
| 3,557,516 | 5/1971 | Gould et al. | 424—46 |
| 3,416,530 | 12/1968 | Ness | 128—260 |
| 3,551,556 | 12/1970 | Kliment et al. | 424—21 |
| 2,870,129 | 1/1959 | Merriam | 260—86.1 |

SHEP K. ROSE, Primary Examiner

U.S. Cl. X.R.

128—260; 424—81; 351—160; 3—13